Dec. 31, 1968   D. T. BERGER   3,419,248
VALVE
Filed March 23, 1966
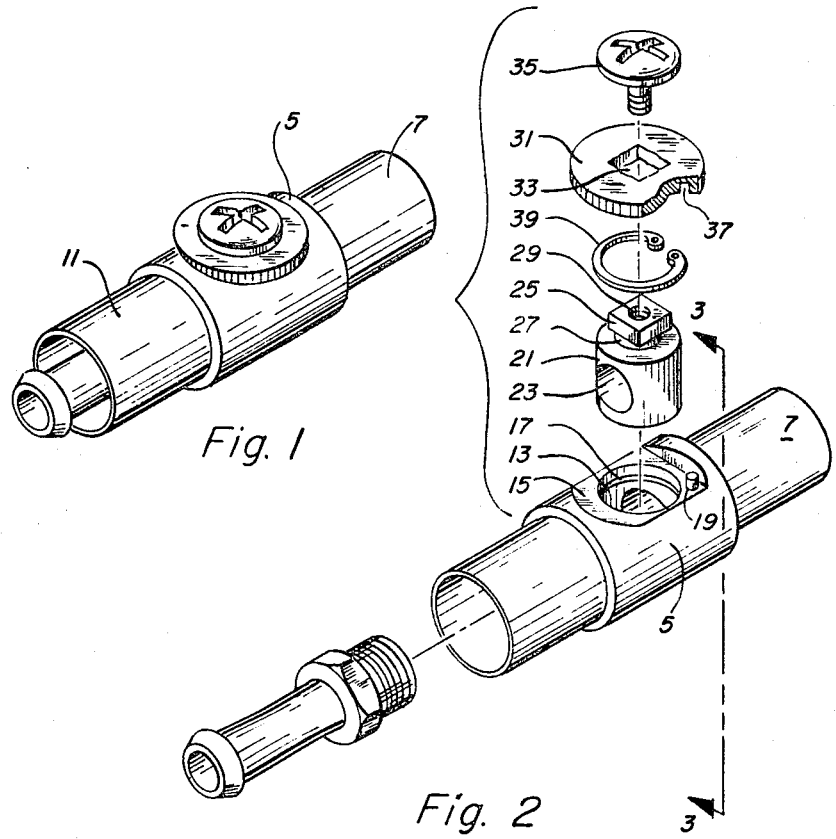
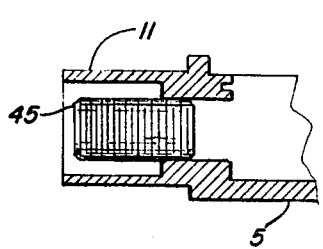
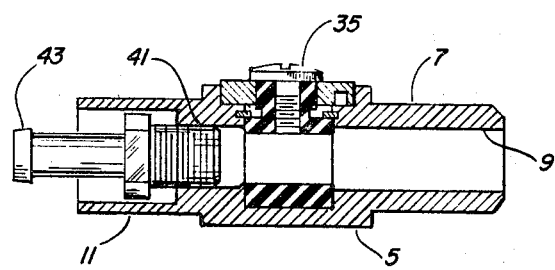
INVENTOR.
Donald T. Berger
BY United States Patent Office 3,419,248
Patented Dec. 31, 1968

3,419,248
VALVE
Donald T. Berger, Santa Cruz, Calif., assignor to Arro Vacuum Inc., a corporation of California
Filed Mar. 23, 1966, Ser. No. 536,864
1 Claim. (Cl. 251—309)

ABSTRACT OF THE DISCLOSURE

A valve coupling disclosed herein comprises a one piece valve body having a central cylindrical portion, a reduced cylindrical portion extending axially from one end and a cylindrical skirt extending axially from the other end. A bore extends axially through the valve body and has one end which is threaded opening into the skirt which houses an adapter. The central portion has a large cylindrical opening extending therein from the side thereof and forming a valve seat and a plug fitting into the seat. The plug has an opening therethrough which upon rotation opens and closes the valve. The plug has a disc-like handle secured to one end substantially tangential to the outer surface of said central cylindrical portion. The disc-like handle has a diameter substantially equal to that of said central cylindrical portion.

---

This invention relates to a valve, and more particularly relates to a valve suitable for use with a dental aspirator.

Dental aspirators are ordinarily used in dentists' offices for the removal of saliva, cuttings and the like, and unless such aspirators are provided with a valve, make an annoying noise when not in use. Further, in the case of those aspirators employing mechanical vacuum units, there is a waste of capacity in the event a valve is not employed.

Although valves or aspirators have previously been proposed, they have not been fully satisfactory. The valve of the present invention was designed specifically to overcome a number of shortcomings of prior art valves.

It is therefore an object of the present invention to provide an improved form of valve for use on a dental aspirator.

Another object of this invention is to provide a valve of the plug-type having an opening in only one side of the valve body providing a sanitary, easy to clean structure.

Another object of this invention is to provide a valve which is easily actuated with one finger while the valve is being held in a user's hand.

Another object of this invention is to provide a valve having a plastic, close-fitting plug which is essentially self-cleaning in operation.

Still a further object of this invention is to provide such a valve having a plastic plug which does not require lubrication.

A still further object of this invention is to provide a valve adapted to receive different sizes of tubing.

Still another object of this invention is to provide a valve which is easy to disassemble and reassemble.

Other objects will be apparent from the balance of the specification.

In the drawings forming part of this application:

FIGURE 1 is a perspective view of a valve embodying the present invention.

FIGURE 2 is an exploded view of the valve shown in FIGURE 1.

FIGURE 3 is a section on the line 3—3 of FIGURE 2.

FIGURE 4 is a partial view, similar to FIGURE 3, showing an alternate form of hose coupling.

Referring now to the drawings by reference characters, there is shown a valve having a central cylindrical valve body 5 and an upper portion 7, the upper portion 7 having a tapered opening 9 adapted to receive a dental aspirator tip and/or surgical tip of standard size. A lower skirt 11 is provided to serve as a cover for the end of a suitable vacuum hose. The cylindrical body 5 has a cylindrical opening 13 at right angles thereto which does not extend completely through the valve body. The top of the valve body is flattened as at 15 and near the top of the cylindrical opening 13, a groove 17 is provided. A pin 19 extends upwardly from the flattened portion 15.

A cylindrical plug 21 made of an inert plastic, such as Teflon, has an opening 23 therein and is provided with a square shoulder 25 with a circumferential groove 27 lying just under the shoulder 25. A small tapped hole 29 is provided in the top of the plug 21 and an actuating handle 31 is provided having a central opening 33 of a suitable size to form a snug fit with the shoulder 25. A screw 35 is provided for assembling the handle onto the plug, screw 35 preferably having a large head so that the opening 33 is completely concealed when the valve is assembled. Handle 31 has a groove 37 which extends about 90° around the periphery of the handle, the groove 37 fitting over the pin 19 and limiting movement of the plug to about 90°. A split locking ring 39 is provided which fits between the grooves 17 on the valve body and groove 27 on the plug so that the plug is retained in place within the valve body yet can rotate freely therewith.

The lower inner portion of the valve body is threaded as at 41 with a tapered thread so that a hose adapter can be screwed therein. Adapters of various sizes can be used, as is shown in the drawings, so that if a small hose is used, a small adapter 43 may be employed or if a large hose is to be used, a larger adapter 45 can be employed.

To assemble the valve, it is only necessary to place plug 21 in opening 13 while locking ring 39 is compressed in groove 27 and allow the ring 39 to expand into the groove 17, whereupon the plug will be locked in place yet will be free to rotate. Handle 31 is now placed over shoulder 25 with groove 37 fitting over pin 19. Screw 35 is now turned into the hole 29, locking the whole assembly in place.

Since the plug 21 is made of a resilient plastic material, it is not necessary to employ a lubricant. Further, since relatively sharp edges are provided around the opening 23 in the plug, the plug tends to be self-cleaning as it is turned.

It will be particularly noted, that the opening 13 does not extend completely through the valve body so that the opposite side of the valve body is unbroken and smooth. Thus, a valve without extending parts is provided which is easy to keep clean in a dental office.

I claim:

1. A valve for a dental aspirator or the like comprising in combination: a one piece valve body having a central cylindrical portion, a reduced cylindrical portion extending axially from one end and a cylindrical skirt extending axially from the other end; a bore extending axially through said valve body and having one end opening into said skirt, said last named one end having screw threads receiving an adapter housed by said skirt; said central cylindrical portion having a cylindrical opening extending therein normal to the axis of the valve body and forming a valve seat; a cylindrical plug fitting into said seat, said plug having an opening therethrough whereby said valve is open when the plug is in a first position and closed when turned 90° thereto; said plug having a polygonal shoulder at one end substantially in the plane of a surface tangent to the outer surface of said central cylindrical portion, a disc-like handle substantially in said plane and having an opening forming a snug fit with said polygonal shoulder, the diameter of the disc-like handle being approximately equal to the diameter of the central cylindrical portion, and separate means securing said plug and handle in operative position.

References Cited

UNITED STATES PATENTS

| | | | |
|---|---|---|---|
| 2,836,388 | 5/1958 | Rakus | 251—309 X |
| 2,844,353 | 7/1958 | Gurries | 251—317 X |
| 3,012,752 | 12/1961 | Buck | 251—309 |
| 3,124,335 | 3/1964 | Mason | 251—309 X |
| 3,185,179 | 5/1965 | Harautuneian | 251—309 X |
| 3,232,579 | 2/1966 | Jeffrey | 251—312 |

M. CARY NELSON, *Primary Examiner.*

MICHAEL O. STURM, *Assistant Examiner.*